United States Patent [19]

Zepeda

[11] Patent Number: 4,787,364

[45] Date of Patent: Nov. 29, 1988

[54] FRYING OVEN

[75] Inventor: Ernesto F. Zepeda, Col. Jaurez C.P., Mexico

[73] Assignee: Errol Rex McNeil, El Cajon, Calif.

[21] Appl. No.: 98,624

[22] Filed: Sep. 21, 1987

[51] Int. Cl.$^4$ ................................................ F24C 3/00
[52] U.S. Cl. ................................................ 126/41 R
[58] Field of Search ............... 126/41 R; 99/352, 445, 99/467

[56] References Cited

U.S. PATENT DOCUMENTS

| | | | |
|---|---|---|---|
| 1,504,102 | 8/1924 | Davis | 99/445 |
| 3,443,510 | 5/1969 | Norton | 99/445 |
| 3,967,613 | 7/1976 | Rybak et al. | 126/41 R |
| 4,598,634 | 7/1986 | Van Horn | 99/445 |

Primary Examiner—Carroll B. Dority, Jr.
Attorney, Agent, or Firm—Kelly, Bauersfeld & Lowry

[57] ABSTRACT

A frying oven is provided for cooking primarily meats under induced humidity conditions in a manner minimizing flame charring of the food. The frying oven includes an open-top body which supports an inclined grill rack spaced over a plurality of gas burners. The grill rack acts to collect grease falling from the food and thus prevent grease contact with the burners during the cooking process. The grill rack also channels the grease to a collection trough which, in turn, channels the grease to an exteriorly located grease collection pan. When cooking, a cover is placed over the body to define a substantially enclosed cooking chamber, and steam is introduced into the chamber to provide a humid cooking environment.

19 Claims, 2 Drawing Sheets

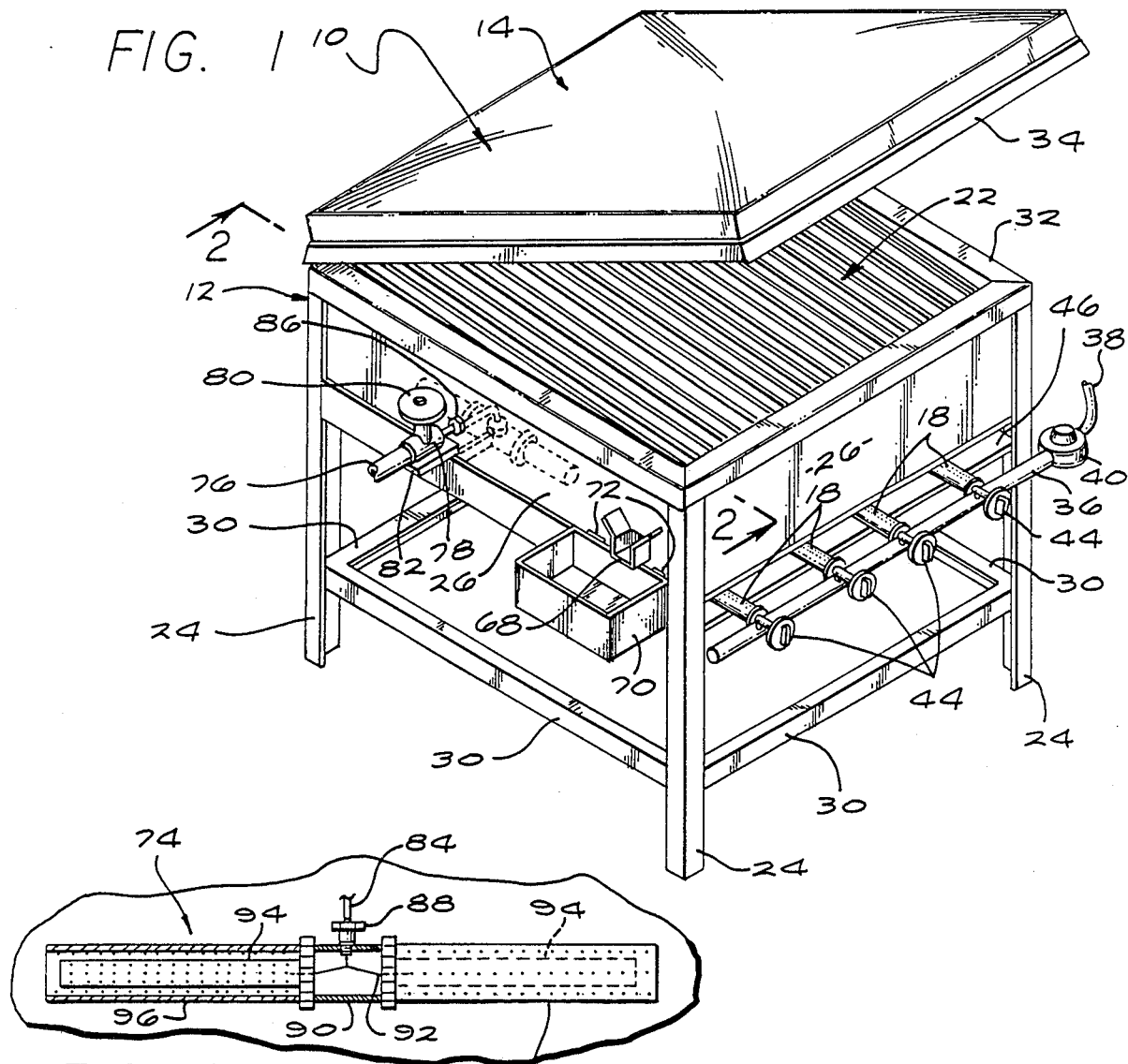
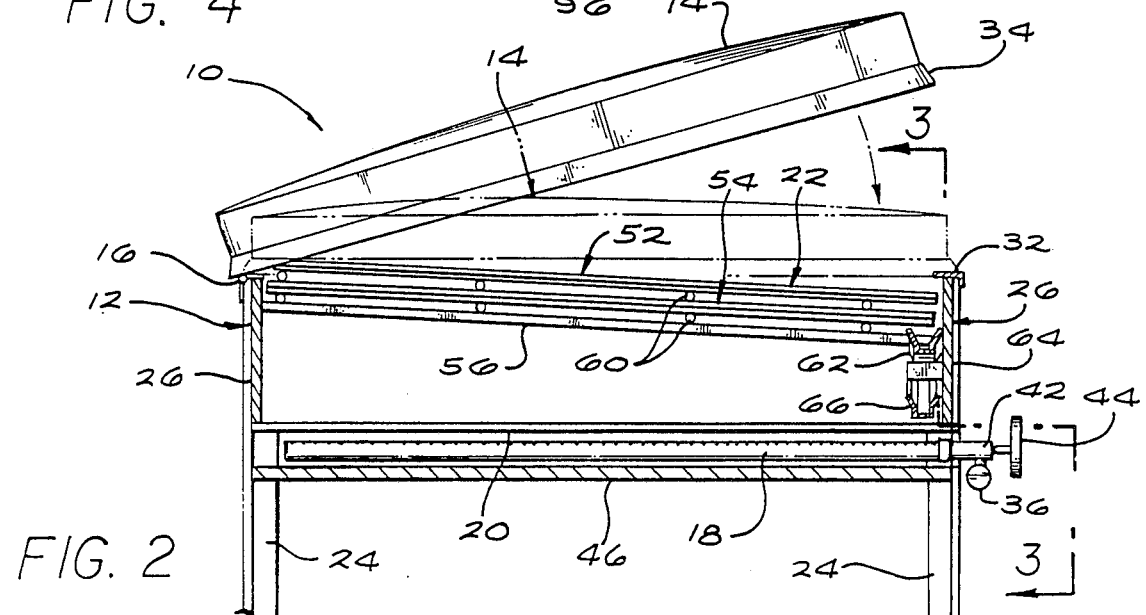

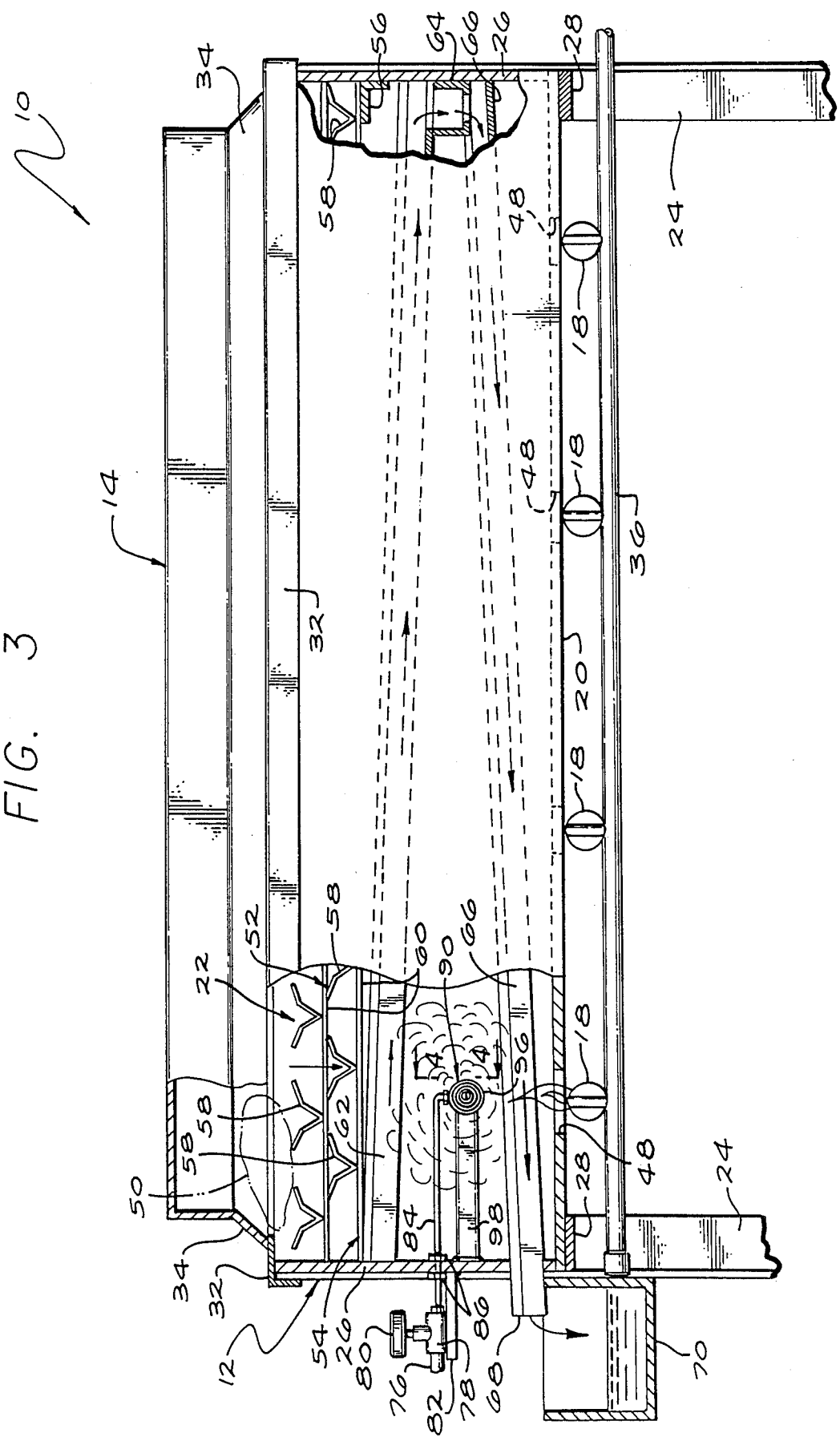

FRYING OVEN

BACKGROUND OF THE INVENTION

This invention relates generally to ovens and related equipment for cooking food products. More specifically, this invention relates to a frying oven designed for cooking primarily meats under induced humidity conditions in a manner minimizing flame charring of the meat.

Cooking appliances in general are relatively well known for use in preparing a wide range of food products. Many such appliances have been developed for specialized needs, to give a chosen food product a desired taste and/or texture.

In particular, oil frying equipment for use in hot oil frying typically includes a reservoir of heated cooking oil into which the desired food products are immersed for a controlled time period. During such frying step, the heated oil vaporizes moisture within the food products and is absorbed partially into the surfaces of the food products, resulting in a crispy and/or crunchy product texture with a distinct oil-based flavor.

Alternatively, so-called fryer ovens or broilers have been utilized to give the food a different texture and less oil-based flavor. Such equipment usually includes a grill situated over one or more burners. The food is simply placed upon the grill and cooked via convected and radiated heat from the burners.

A principle drawback of these frying ovens is that when the grease drips from the food product through the grill into proximity with the burners, the grease ignites and produces flames which can often rise to the level of the food on the grill. If the flames contact the food product being cooked, charring of the outer layer of the food product can occur. Further, the food products cooked utilizing such appliances also tend to be less moist than desired at times.

Accordingly, there has been a need for a novel frying oven appliance which can cook food products in an efficient manner over one or more burners, and minimize any flame charring of the food in the process. Such a novel frying oven appliance should also prevent excessive moisture loss from the food product while being cooked. Additionally, a frying oven is needed which is easy to use, of economical construction, and safe. The present invention fulfills these needs and provides other related advantages.

SUMMARY OF THE INVENTION

The present invention resides in an improved frying oven for cooking a variety of food products under induced humid conditions in a manner minimizing flame charring. The frying oven comprises, generally, a body and a pivotable cover which together define a substantially enclosed, low-pressure cooking chamber. Burner means are situated adjacent a lower wall of the body, and a grill rack is positioned within the cooking chamber above the burner means for supporting the food being cooked. Means are provided for collecting the grease produced by the food on the grill rack during cooking, and for preventing contact between the grease and the burner means. Finally, means are provided for producing a humid environment within the cooking chamber during the cooking process.

More specifically, in a preferred form of the invention the body resembles a box-like container having four generally vertical walls extending upwardly from the lower wall. The cover is dimensioned to substantially overlie and engage an upper edge of the body formed by the vertical walls. The burner means includes a plurality of selectively adjustable gas burners extending below the lower body wall. In order to permit direct heating of the cooking chamber, the lower body wall includes a slot situated directly above each gas burner. Moreover, it is preferred that each of the gas burners receive gas through a common gas manifold which feeds gas to the individual burners under a regulated pressure.

The grill rack is constructed to collect substantially all grease produced by the food, and is supported by the body in a manner causing the collected grease to be channeled to a side of the body. In particular, the grill rack includes an upper grease collection rack having a plurality of upper spaced-apart parallel grease-collecting channels, and a lower grease collection rack having a similar plurality of lower spaced-apart parallel grease-collecting channels. These lower parallel grease-collecting channels are positioned to collect grease falling between the upper parallel grease-collecting channels, and yet permit the free circulation of air and passage of heat between the separate grease collection racks so as to minimize any interference with the cooking process.

A grease collection trough is fixed to a vertical wall of the body below the lowest point of the grill rack. This grease collection trough provides a sloping pathway for channeling the grease collected by the grill rack to a body aperture whereat the grease passes out of the cooking chamber. This collection and channeling of the grease is all accomplished without permitting contact between the grease and the burner means to minimize burning of the grease which can cause charring of the food. A grease collection pan attachable to the exterior of the body provides a receptacle for the grease as it exits the cooking chamber.

In addition to preventing grease-induced flare-ups which can char the food, it is further desirable to seal as much moisture into the food product as possible. To this end, the means for producing a humid environment within the cooking chamber includes a drip injection steam generator having a valve means for controlling flow of water into the cooking chamber, and vaporizer means within the cooking chamber whereat the water is held and heated until converted into steam. More particularly, the vaporizer means includes a pair of coaxial perforated tubes from which the steam passes into the cooking chamber when heated by the gas burners.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a frying oven embodying the invention;

FIG. 2 is a fragmented, elevational, sectional view of the frying oven taken generally along the line 2—2 of FIG. 1, illustrating the manner in which a grill rack is positioned within a body beneath a cover, for collecting grease from a food product during the cooking process;

FIG. 3 is an enlarged, fragmented, elevational and partially sectional view of the frying oven taken generally along the line 3—3 of FIG. 2, illustrating the grill rack in more detail and further the manner in which grease is channeled through a plurality of troughs to a grease collection pan attached to the exterior of the body; and FIG. 4 is an enlarged elevational view of a drip injection steam generator situated within the body, taken generally along the line 4—4 of FIG. 3.

DETAILED DESCRIPTION OF THE PREFERRED EMBODIMENT

As shown in the drawings for purposes of illustration, the present invention is concerned with an improved frying oven, generally designated in the accompanying drawings by the reference number 10. This improved frying oven 10 comprises, generally, an open-top, box-like body 12, and a cover 14 attached to the upper edge of the body at a hinge 16. A plurality of gas burners 18 are situated beneath a lower wall 20 of the body 12 for heating a cooking chamber defined by the area enclosed by the body and the cover 14. Further, a grill rack 22 is positioned within the cooking chamber for supporting the food being cooked.

The novel frying oven 10 of this invention is designed for efficient cooking of food products in a manner minimizing flame charring of the food. Additionally, moisture loss from the food product during the cooking process is minimized in a safe and economical manner. It has been found that chicken cooked in the novel frying oven 10 is particularly moist and delicious, but other types of food products can likewise benefit from the features of the present invention.

In accordance with the present invention, and as illustrated with respect to a preferred embodiment in the accompanying drawings, the body 12 is supported over a floor or other horizontal surface by four legs 24. These legs 24 support four vertical walls 26 which together define the sides of the cooking chamber. The lower body wall 20 engages the lower edges of the vertical walls 26, and is held in place by means of lower wall support lips 28 extending between opposite pairs of the legs 24.

Horizontal stabilization bars 30 extend between adjacent legs 24 near their lower ends to firmly position the legs in a square relationship and thus facilitate stability of the frying oven 10. Overlying the upper edge of the vertical walls 26 and the legs 24 is an upper body lip 32 which provides a relatively planar engaging surface for the cover 14. In this regard, the cover 14 is provided a downwardly facing peripheral lip 34 intended to engage the upper body lip 32 and form a loose seal to facilitate a low pressure build-up within the cooking chamber when the cover is in a closed position.

Each of the gas burners 18 is connected to a gas manifold 36 which is supplied fuel gas from a gas line 38 through a pressure regulator 40. Each of the gas burners 18 is equipped with a selectively adjustable control valve 42 provided an adjustment knob 44 which permits a user of the frying oven 10 to selectively adjust the amount of gas (and therefore heat) to be delivered through each burner.

To support the burners 18 below the lower body wall 20, a burner support plate 46 is fixed to the legs 24 immediately below the burners. In this manner, the burners 18 can be securely positioned immediately adjacent the cooking chamber. The lower body wall 20 includes a plurality of slots 48 situated directly above each gas burner 18. This arrangement permits direct heating of the cooking chamber by the burners.

The grill rack 22 is positioned within the body 12, and provides a supporting surface for food 50 cooked within the frying oven 10 above the burners 18. The grill rack 22 is constructed to collect substantially all grease produced by the food 50 supported thereon while being cooked, and then channel the collected grease to one side of the body 12. More specifically, the grill rack 22 includes an upper grease collection rack 52 and a lower grease collection rack 54. The lower grease collection rack 54 is supported within the body 12 by means of grill rack support flanges 56 affixed to two opposite vertical walls 26. Both the upper and lower grease collection racks 52 and 54 include a plurality of spaced-apart, parallel, V-shaped grease collecting channels 58 attached to several perpendicular underlying support bars 60. The grease collecting channels 58 of the lower grease collection rack 54 are positioned to collect grease falling between the similar channels 58 of the upper grease collection rack 52. Grease is thus prevented from dripping from the food 50 downwardly for ignition by the burners 18.

The lower grease collection rack 54 is dimensioned to substantially span the width and depth of the cooking chamber, and the underlying support bars 60 for the lower collection rack engages the rack support flanges 56 to hold the lower collection rack in place. Importantly, the rack support flanges 56 are inclined from the front of the cooking chamber toward the rear, to hold the grill rack 22 in a manner causing grease collected thereon to flow toward the front of the frying oven 10. The underlying support bars 60 of the upper grease collection rack 52 simply rest upon the upper edges of the grease collecting channels 58 of the lower grease collection rack 54. Both collection racks 52 and 54 are easily removable from the cooking chamber for cleaning and maintenance purposes.

An upper grease collection trough 62 is fixed to the vertical wall 26 forming the front of the cooking chamber, below the lowest point of the grill rack 22. This upper trough 62 is positioned and configured to collect substantially all the grease initially impinging upon the grease collecting channels 58, and to provide an initial segment of a conduit eventually taking the collected grease outside the cooking chamber. The upper grease collection trough 62 slopes gently downwardly from one side of the cooking chamber to an opposite side, and dumps the collected grease, through a trough connection conduit 64, into a lower grease collection trough 66. This lower trough 66 similarly slopes gently downwardly in the opposite direction as the upper trough 62 from one side of the cooking chamber to the other, and extends through one of the vertical walls 26 to a grease collection trough outlet 68 situated exteriorly of the cooking chamber.

Situated immediately below the trough outlet 68 is a grease collection pan 70 which is removably attachable to the body 12. In the illustrated embodiment, the collection pan 70 is fixed to the body 12 by means of two tongue and slot attachments 72 between the collection pan and the vertical wall 26 adjacent the trough outlet 68. Thus, whenever the collection pan 70 becomes filled with grease, a convenient means is provided for easily disposing of the collected grease.

Further, means are provided for introducing steam within the cooking chamber to produce an induced humidity cooking environment within the cooking chamber during the cooking process. To accomplish this, a drip injection steam generator 74 is provided for introducing water into the cooking chamber and includes vaporizing means for turning that water into steam. As illustrated in FIGS. 1 and 3, the steam generator 74 receives water through a supply line 76 at a valve 78. The valve 78 is of the standard variety and includes a valve handle 80 which permits the user to conveniently control passage of water from the supply line 76 through the steam generator 74 and into the cooking chamber. A short plank 82 extends outwardly from the adjacent vertical wall 26 to provide a support for the valve 78. A reduced diameter copper tube 84 extends from the valve 78, opposite the water supply line 76, through the vertical wall 26 and into the cooking chamber. A pair of nuts 86 are usually threaded onto the copper tubing 84 on opposite sides of the vertical wall 26 to securely position the copper tubing in place and to further prevent any steam blow-by past the generator 74.

As illustrated best in FIG. 4, the vaporizer means portion of the steam generator 74 comprises an adjustable drip valve 88 which is attached to a cylindrical connector assembly 90. Within this connector assembly 90 is provided a deflector 92 immediately below the drip valve 88, whereupon water passing through the drip valve is directed laterally outwardly into two oppositely extending inner perforated tubes 94 supported by the connector assembly 90. Surrounding these inner perforated tubes 94 are coaxial outer perforated tubes 96 which, in connection with the inner perforated tubes function to hold the water introduced into the vaporizer means until heated sufficiently by the gas burners 18 to form steam. The steam is then permitted free passage through the perforations of both tubes 94 and 96. The vaporizer means is supported within the cooking chamber by an arm 98 connected at one end to the wall 26 and at the other end to the connector assembly 90.

In operation, the gas burners 18 are initially ignited to preheat the cooking chamber. Food 50 is placed on the grill rack 22, and the cover 14 is closed upon the body 12 to create a substantially enclosed cooking chamber. The valve 78 is opened to create a humid cooking environment within the cooking chamber, however the steam pressure within the cooking chamber will necessarily remain at a low level due to the various openings provided in the body 12.

As some types of food are heated, they begin to expel droplets of grease which, if permitted to fall into contact with the burner flames, would ignite and produce flare-ups which could char the food. The collecting channels 58 of the upper and lower collection racks 52 and 54 effectively prevent this from happening by collecting substantially all grease falling from the food, and channeling that grease toward the front of the cooking chamber. The grease is then permitted to fall from the grease collecting channels 58 into the upper grease collection trough 62. The grease then travels a path defined by the arrows in FIG. 3 through the trough outlet 68, where the grease is collected within the pan 70.

From the foregoing it is to be appreciated that the improved frying oven 10 of the present invention efficiently minimizes flame charring of the food while simultaneously providing a humid cooking condition which has the effect of minimizing moisture loss within the food product being cooked. The novel frying oven 10 of the present invention is easy to use, of economical construction and safe.

Although a particular embodiment of the invention has been described in detail for purposes of illustration, various modifications may be made without departing from the spirit and scope of the invention. Accordingly, the invention is not to be limited, except as by the appended claims.

I claim:

1. A frying oven, comprising:
   a substantially enclosed cooking chamber;
   burner means situated below a lower wall defining a portion of the cooking chamber;
   a grill rack supported within the cooking chamber and above the burner means, which grill rack provides a support surface for food cooked within the frying oven;
   means for collecting grease produced by food on the grill rack as it is cooked, the collecting means preventing contact between the grease and the burner means; and
   a drip injection steam generator located in the cooking chamber above the burner means for producing a humid environment within the cooking chamber during the cooking process, the drip injection steam generator including means for providing drops of water into a perforated tube.

2. A frying oven as set forth in claim 1, wherein the cooking chamber is defined by an open-top body and a cover hinged to the body.

3. A frying oven as set forth in claim 1, wherein the grill rack includes an upper grease collection rack having a plurality of upper spaced-apart parallel grease-collecting channels, and a lower grease collection rack having a plurality of lower spaced-apart parallel grease-collecting channels, wherein the lower parallel grease-collecting channels are positioned to collect grease falling between the upper parallel grease-collecting channels.

4. A frying oven as set forth in claim 3, wherein the collecting means includes a grease collection trough fixed to a wall of the body adjacent an end of each grease collection rack to facilitate flow of grease from the collection racks to the grease collection trough, the grease collection trough providing a sloping pathway for directing the grease out of the cooking chamber.

5. A frying oven as set forth in claim 4, wherein the grease collection trough comprises a plurality of trough segments which direct the grease to a grease collection pan situated exteriorly of the cooking chamber.

6. A frying oven as set forth in claim 1, wherein the burner means includes a plurality of selectively adjustable gas burners extending below the cooking chamber, wherein openings are provided in the lower wall adjacent each burner to permit direct heating of the cooking chamber by the burners.

7. A frying oven as set forth in claim 1, wherein the drip injection steam generator for producing a humid environment within the cooking chamber includes means for adjusting the rate at which water is provided to the perforated tube.

8. A frying oven, comprising:
   an open-top body;
   a cover hinged to the body which, when closed, creates with the body a substantially enclosed cooking chamber;
   burner means situated below a lower wall defining a portion of the body;

an inclined grill rack means supported within the body, the grill rack means providing a supporting surface for food cooked within the frying oven, the grill rack means further being constructed to collect substantially all grease produced by the food supported thereon while being cooked and channeling the collected grease to a side of the body;

means for channeling the grease collected by the grill rack means to a location exterior of the cooking chamber in a manner preventing contact between the grease and the burner means; and a drip injection steam generator located in the cooking chamber above the burner means for introducing steam within the cooking chamber to produce an induced humid cooking environment within the cooking chamber during the cooking process, the drip injector steam generator including means for providing drops of water into a perforated tube.

9. A frying oven as set forth in claim 8, wherein the burner means includes a plurality of gas burners extending below the lower body wall, and wherein the lower body wall includes a slot situated directly above each gas burner to permit direct heating of the cooking chamber.

10. A frying oven as set forth in claim 9, wherein each gas burner is selectively adjustable.

11. A frying oven as set forth in claim 8, wherein the grill rack means includes an upper grease collection rack having a plurality of upper spaced-apart parallel grease-collecting channels, and a lower grease collection rack having a plurality of lower spaced-apart parallel grease-collecting channels.

12. A frying oven as set forth in claim 10, wherein the lower parallel grease-collecting channels are positioned to collect grease falling between the upper parallel grease-collecting channels.

13. A frying oven as set forth in claim 8, wherein the channeling means includes a grease collection trough fixed to a wall of the body below the lowest point of the grill rack means, the grease collection trough providing a sloping pathway to a body aperture whereat the grease passes out of the cooking chamber.

14. A frying oven as set forth in claim 13, wherein the grease collection trough comprises a plurality of trough segments.

15. A frying oven as set forth in claim 8, including means for holding for disposal the grease directed out of the cooking chamber by the channeling means.

16. A frying oven as set forth in claim 15, wherein the grease holding means includes a grease collection pan attachable to the exterior of the body.

17. A frying oven as set forth in claim 8, wherein the drip injection steam generator which produces steam within the cooking chamber including means for adjusting the rate at which water is provided to the perforated tube.

18. A frying oven as set forth in claim 17, wherein the drip injection steam generator includes a valve means for controlling flow of water into the cooking chamber, and wherein the perforated tube provides vaporizer means within the cooking chamber whereat water is held and heated until converted to steam which is permitted free passage from the vaporizer means.

19. A frying oven for cooking foods under induced humidity conditions in a manner minimizing flame charring of the foods being cooked, the frying oven comprising:

an open-top, box-like body;

a cover hinged along an upper edge of the body which, when closed, defines with the body a substantially enclosed cooking chamber;

burner means situated adjacent a lower wall defining a portion of the body, the burner means including a plurality of selectively adjustable gas burners extending below the lower body wall, wherein the lower body wall includes a slot situated directly above each gas burner to permit direct heating of the cooking chamber;

an inclined grill rack means supported within the body, the grill rack means providing a supporting surface for food cooked within the frying oven, the grill rack means further being constructed to collect substantially all grease produced by the food supported thereon while being cooked, and channeling the collected grease to a side of the body, the grill rack means including an upper grease collection rack having a plurality of upper spaced-apart parallel grease-collecting channels, and a lower grease collection rack having a plurality of lower spaced-apart parallel grease-collecting channels, wherein the lower parallel grease-collecting channels are positioned to collect grease falling between the upper parallel grease-collecting channels;

means for channeling the grease collected by the grill rack means to a location exterior of the cooking chamber in manner preventing contact between the grease and the burner means, the channeling means including a grease collection trough fixed to a vertical wall of the body below the grill rack means, the grease collection trough providing a sloping pathway to a body aperture whereat the grease passes out of the cooking chamber;

means for holding for disposal the grease directed out of the cooking chamber by the channeling means, the grease holding means including a grease collection pan attachable to the exterior of the body; and means for introducing steam within the cooking chamber to produce a humid cooking environment within the cooking chamber during the cooking process, the steam introduction means including a steam generator having a valve for controlling introduction of water from water supply means to the cooking chamber, vaporizer means within the cooking chamber for heating water introduced therein sufficiently to produce steam, and conduit means between the valve and the vaporizing means, wherein the vaporizer means includes an adjustable drip valve whereat the flow rate of water into the vaporizer means can be controlled, and perforated tube means for receiving water passing through the adjustable drip valve and suspending that water into the proximity of the burner means.

* * * * *

UNITED STATES PATENT AND TRADEMARK OFFICE
CERTIFICATE OF CORRECTION

PATENT NO. : 4,787,364

DATED : November 29, 1988

INVENTOR(S) : Ernesto F. Zepeda

It is certified that error appears in the above-identified patent and that said Letters Patent is hereby corrected as shown below:

In Column 7, line 18, delete the word "injector" and insert therefor --injection--.

In Column 7, line 35, delete the number "10" and insert therefor --11--.

In Column 8, line 36, add the word "a" between the words "in" and "manner."

Signed and Sealed this

Second Day of May, 1989

*Attest:*

DONALD J. QUIGG

*Attesting Officer*    *Commissioner of Patents and Trademarks*